(12) United States Patent
Kitagawa (10) Patent No.: US 8,771,452 B2
(45) Date of Patent: Jul. 8, 2014

(54) PROCESS FOR PRODUCING FIBER-REINFORCED RESIN MATERIAL (75) Inventor: Tatsuya Kitagawa, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/819,150

(22) PCT Filed: Aug. 27, 2010

(86) PCT No.: PCT/JP2010/064547
§ 371 (c)(1),
(2), (4) Date: Feb. 26, 2013

(87) PCT Pub. No.: WO2012/026031
PCT Pub. Date: Mar. 1, 2012

(65) Prior Publication Data
US 2013/0153130 A1 Jun. 20, 2013

(51) Int. Cl.
B29C 70/50 (2006.01)
(52) U.S. Cl.
USPC ........ 156/205; 156/206; 156/219; 156/308.2; 156/308.4; 156/309.6
(58) Field of Classification Search
None
See application file for complete search history.

(56) References Cited

U.S. PATENT DOCUMENTS 5,312,511 A * 5/1994 Fell ............................... 156/469

FOREIGN PATENT DOCUMENTS

| CA | 2 658 572 A1 | 5/2008 |
|---|---|---|
| JP | 05-148749 | 6/1993 |
| JP | 5-185539 A | 7/1993 |
| JP | 07-047625 | 2/1995 |
| JP | 2005-262818 A | 9/2005 |
| JP | 2006-130698 A | 5/2006 |
| JP | 2008-149708 A | 7/2008 |

OTHER PUBLICATIONS

International Preliminary Report on Patentability in corresponding PCT/JP2010/064547 dated Mar. 19, 2013.

* cited by examiner

*Primary Examiner* — Barbara J Musser
(74) *Attorney, Agent, or Firm* — Sughrue Mion, PLLC (57) ABSTRACT

There is provided a process for producing a fiber-reinforced resin material capable of mitigating damage to and defects in reinforcement fibers and of performing lamination with the reinforcement fibers positioned with ease, while at the same time causing them to conform to the shape of the mold with ease at the time of molding. It comprises at least: a step of producing a fiber-reinforced resin sheet (4A) from a reinforcement fiber sheet (2) and a resin sheet (3A) comprising a thermoplastic resin; a step of molding the fiber-reinforced resin sheet (4A) in such a manner as to form a protruding part (4c) on one face (4a) of the fiber-reinforced resin sheet (4A) along one direction and to form a recessed part (4d) along the one direction in another face (4b); a step of laminating the fiber-reinforced resin sheet (5A) while causing at least the protruding part (4c) of the molded fiber-reinforced resin sheet (5A) to engage with a fiber-reinforced resin sheet (5A) that is to be laminated therewith; and a step of molding the laminated fiber-reinforced resin sheets (5A) into the fiber-reinforced resin material while pressurizing and heating them so as to impregnate the reinforcement fibers with the thermoplastic resin.

12 Claims, 10 Drawing Sheets

PROCESS FOR PRODUCING FIBER-REINFORCED RESIN MATERIAL

CROSS REFERENCE TO RELATED APPLICATIONS

This application is a National Stage of International Application No. PCT/JP2010/064547 filed Aug. 27, 2010, the contents of which are incorporated herein by reference in their entirety.

TECHNICAL FIELD

The present invention relates to a process for producing a fiber-reinforced resin material obtained by impregnating reinforcement fibers with a thermoplastic resin.

BACKGROUND ART

Fiber-reinforced resin materials (FRPs) obtained by impregnating reinforcement fibers with a matrix resin have conventionally been lighter than metal materials and stronger than resin materials. In particular, those that use a thermoplastic resin for the matrix resin are receiving attention for applications in mechanical products, e.g., vehicle body parts, etc., due to the ease with which they can be molded.

However, when a thermoplastic resin is used for the matrix resin, since thermoplastic resins are more viscous than thermosetting resins, it is not easy to impregnate gaps in the reinforcement fibers with the thermoplastic resin. As such, by way of example, there is a practice where impregnation with a thermoplastic resin is performed by making the thickness of a bundle of reinforcement fibers that are drawn and aligned in the same direction thinner by spreading a multifilament, and so forth. However, since a fiber-reinforced resin sheet comprising a reinforcement fiber and a thermoplastic resin becomes thin, such sheets are laminated and integrally molded to obtain the desired thickness.

By way of example, in the fiber-reinforced resin material production process of Patent Literature 1, first, a plurality of reinforcement fiber sheets, in which a plurality of reinforcement fibers are drawn and aligned in the same direction, and thermoplastic resin reinforcement sheets each comprising a thermoplastic resin sheet are laminated. Next, in order to position these sheet materials, the sheet materials are fixed to one another with a stitching thread made of a thermoplastic resin. By thereafter heating and pressurizing the laminated sheet materials, a fiber-reinforced resin material is produced.

With such a production process, since the laminated sheets are integrated with one another with the stitching thread, sheet misalignments are unlikely to occur, and operability is also favorable. Further, by virtue of the fact that the stitching thread comprises a thermoplastic resin, this stitching thread impregnates the gaps between the reinforcement fibers at the time of molding.

In addition, in Patent Literature 2, there is proposed a process for producing a multi-axially laminated reinforcement fiber sheet (fiber-reinforced resin material) in which a reinforcement fiber sheet, which is drawn and aligned in the same direction, and an oblique reinforcement fiber sheet, which has an orientation angle that differs from the fiber direction of the reinforcement fiber sheet, are laminated with a thermoplastic resin matrix layer in-between, and the these layers are bonded with one another with a thermal adhesive.

Further, in Patent Literature 3, there is proposed a process for producing a fiber-reinforced resin material in which ingredient sheets comprising a reinforcement fiber and a thermoplastic resin are laminated, and the sheets are thermally bonded with one another through ultrasonic spot welding.

CITATION LIST

Patent Literature

Patent Literature 1: JP Patent Application Publication (Kokai) No. 2008-149708 A
Patent Literature 2: JP Patent Application Publication (Kokai) No. 2006-130698 A
Patent Literature 3: JP Patent Application Publication (Kokai) No. 5-185539 A (1993)

SUMMARY OF INVENTION

Technical Problem

However, with the production process according to Patent Literature 1, since the stitching thread penetrates the laminated sheets in their thickness direction, the reinforcement fibers are prone to damage and defects, and the strength of the produced fiber-reinforced resin material decreases.

In this respect, with the production process according to Patent Literature 2, by using a thermal adhesive, it is possible to fix the sheets to one another while preventing reinforcement fiber damage and defects. However, even in this case, since the thermal adhesive is a resin that is different from the thermoplastic resin that is the matrix resin, when molded into a fiber-reinforced resin material, a resin of a different kind than the matrix resin would be mixed therein. As a result, there is a risk that the mechanical strength of the produced fiber-reinforced resin material might decrease.

In these respects, with the production process according to Patent Literature 3, since the sheets are bonded to one another by melting the thermoplastic resin without using a stitching thread or a thermal adhesive, it might seem a favorable process at first glance. However, in order to weld by means of ultrasonic waves, there are constraints on the thickness of the sheets to be bonded. Further, when bonding by means of ultrasonic waves, laminated sheets must be fixed. Given the above, one would have no choice but to adopt a process in which bonding is performed sheet by sheet (layer by layer), which requires time and effort.

Further, sheets laminated by the processes discussed above are completely fixed between layers. Accordingly, at the time of pressing, movement of the reinforcement fibers is restricted, thereby making it difficult, in some cases, to mold them to conform to the shape of the mold.

The present invention is made in view of the circumstances mentioned above, and there is provided a fiber-reinforced resin material production process which, in laminating fiber-reinforced resin sheets, is capable of reducing damage to and defects in reinforcement fibers and of positioning and laminating them with ease, while at the same time making it possible for the reinforcement fibers to conform to the shape of the mold with ease at the time of molding.

Solution to Problem

With a view to solving the problems above, the inventors, through diligent consideration, have obtained a new insight which is that by, before laminating fiber-reinforced resin sheets, giving these fiber-reinforced resin sheets recessed/protruding shapes for positioning, and provisionally fastening the fiber-reinforced resin sheets with one another using these shapes, it is possible to simultaneously mitigate misalignment among the fiber-reinforced resin sheets as well as damage to the reinforcement fibers, e.g., cutting, etc., without using stitching or a thermal adhesive, as well as to allow the reinforcement fibers to move between layers and conform to the shape of the mold with ease at the time of molding.

A process for producing a fiber-reinforced resin material according to the present invention is a process for producing a fiber-reinforced resin material comprising reinforcement fibers and a thermoplastic resin, the process comprising at least: a step of producing a fiber-reinforced resin sheet from a reinforcement fiber sheet in which the reinforcement fibers are drawn and aligned in the same direction and a resin sheet comprising the thermoplastic resin; a step of molding the fiber-reinforced resin sheet by heating and pressurizing at least parts of the fiber-reinforced resin sheet corresponding to a protruding part and a recessed part so as to form the protruding part on one face of the fiber-reinforced resin sheet along one direction and to form the recessed part along the one direction in another face located on the opposite side to the protruding part; a step of laminating the fiber-reinforced resin sheet while causing at least the protruding part of the molded fiber-reinforced resin sheet to engage with a fiber-reinforced resin sheet that is to be laminated therewith; and a step of molding the laminated fiber-reinforced resin sheets into the fiber-reinforced resin material while pressurizing and heating them so as to impregnate the reinforcement fibers with the thermoplastic resin.

According to the present invention, first, in the step of producing a fiber-reinforced resin sheet, a reinforcement fiber sheet in which reinforcement fibers are drawn and aligned in the same direction is made to contact, or adhere to, a resin sheet comprising a thermoplastic resin with which the reinforcement fibers are to be impregnated, thereby producing a fiber-reinforced resin sheet comprising the above. It is noted that, in so doing, the gaps between the reinforcement fibers may be impregnated with the thermoplastic resin as well.

Next, in the step of molding the fiber-reinforced resin sheet, by heating and pressurizing at least the parts of the produced fiber-reinforced resin sheet corresponding to the protruding part and recessed part, the protruding part formed in one direction is formed on one face, and the recessed part is formed in the other face located on the opposite side to the protruding part.

Next, in the step of laminating the fiber-reinforced resin sheet, a plurality of the fiber-reinforced resin sheets are sequentially laminated with one another while causing the protruding parts to engage with the fiber-reinforced resin sheets to be laminated therewith. Accordingly, it is possible to provisionally fasten the fiber-reinforced resin sheets with one another while positioning the fiber-reinforced resin sheets relative to one another with ease. Thus, by means of the shape of the fiber-reinforced resin sheets, it is possible to maintain a laminated state of the fiber-reinforced resin sheets without using stitching, an adhesive, etc.

Further, when molding the laminated fiber-reinforced resin sheets by pressurizing and heating them, since the fiber-reinforced resin sheets are in a provisionally fastened state with respect to one another, they may be molded into a fiber-reinforced resin material by causing, with ease, the reinforcement fibers to conform to the shape of the mold with almost no misalignment among the fiber-reinforced resin sheets.

In the step of molding the fiber-reinforced resin sheet, so long as the recessed part and the protruding part are formed in/on the fiber-reinforced resin sheet through heating and pressurization, there are no particular limitations such as press molding, etc. However, in a preferred aspect, in the step of molding the fiber-reinforced resin sheet, using a pair of heating rollers in which at least a protruding ridge part is formed on a roller circumferential surface of one of the heating rollers and a recessed groove part corresponding to the shape of the protruding ridge part is formed in a roller circumferential surface of the other heating roller, the protruding part and the recessed part are molded by performing pressurization and heating while sandwiching the fiber-reinforced resin sheet between the protruding ridge part and the recessed groove part between the pair of heating rollers With such an aspect, by continuously passing the fiber-reinforced resin sheet between the pair of heating rollers, recessed parts are formed at places that come into contact with the protruding ridge part and protruding parts are formed at places that come into contact with the recessed groove part, and these protruding parts and recessed parts may thus be molded in a regular pattern.

In addition, in the step of laminating the fiber-reinforced resin sheet, as long as the fiber-reinforced resin sheets engage with one another by means of the protruding parts, and their laminated state can be maintained by provisionally fastening the fiber-reinforced resin sheets with one another, there are no particular limitations. However, in a preferred aspect, in the step of laminating the fiber-reinforced resin sheet, the fiber-reinforced resin sheets are laminated in such a manner that the protruding parts and the recessed parts of the fiber-reinforced resin sheets to be laminated with one another overlap with one another.

With such an aspect, by causing the protruding parts and the recessed parts of the fiber-reinforced resin sheets to be laminated with one another to overlap with one another, the fiber-reinforced resin sheets may be laminated with the protruding parts made to engage with the recessed parts. Thus, it is possible to provisionally fasten and laminate these sheets with ease while positioning them more stably. As a result, it becomes possible to accurately fixate the post-molding fiber orientation of the reinforcement fibers without any positional or angle misalignment of the fiber-reinforced resin sheets at the time of laminating.

In addition, while the fiber directions of the reinforcement fibers of the fiber-reinforced resin sheets to be laminated may be identical, in order for the obtained fiber-reinforced resin material to have mechanical pseudo-isotropy, it is preferable that their fiber directions be different. Accordingly, in a preferred aspect, in the step of molding the fiber-reinforced resin sheet, in order to form, along a direction that differs from the fiber direction in which the reinforcement fibers are drawn and aligned, the protruding parts of the respective fiber-reinforced resin sheets to be laminated, a plurality of the fiber-reinforced resin sheets corresponding to the protruding parts along the different direction are molded, and the fiber-reinforced resin sheets on which the protruding parts are formed along the different direction are laminated with one another.

With the present invention, by laminating, with one another, the respective fiber-reinforced resin sheets on/in which the protruding parts and the recessed parts are formed in different directions, the fiber directions of the reinforcement fibers of the laminated fiber-reinforced resin sheets become different, and the reinforcement fibers become multi-axially oriented. Thus, the obtained fiber-reinforced resin material will have mechanical isotropy (pseudo-isotropy).

In addition, in a preferred aspect, the step of molding the fiber-reinforced resin sheet comprises at least: a step of molding a first fiber-reinforced resin sheet in such a manner as to form the protruding part and the recessed part along a first direction that intersects with a fiber direction in which the reinforcement fibers are drawn and aligned; and a step of molding a second fiber-reinforced resin sheet in such a manner as to form the protruding part and the recessed part along a second direction that differs from the first direction, and in the step of laminating the fiber-reinforced resin sheet, the first and second fiber-reinforced resin sheets are alternately laminated.

With the present invention, since the fiber directions of the reinforcement fibers of at least these two fiber-reinforced resin sheets intersect, a fiber-reinforced resin material having mechanical pseudo-isotropy may be obtained in a simpler manner.

Further, as a more specific first aspect, it is preferable that the first direction be orthogonal to the fiber direction, and that the second direction be the fiber direction. As a more specific second aspect, it is preferable that the first direction intersect with the fiber direction at a predetermined angle, and that the second direction be along the fiber direction or orthogonal to the fiber direction.

With the first aspect, it is possible to obtain a fiber-reinforced resin material comprising reinforcement fibers oriented along two axes in such a manner that the reinforcement fibers intersect at 90°. In addition, with the second aspect, it is possible to obtain a fiber-reinforced resin material comprising reinforcement fibers of two axes where the reinforcement fibers intersect at a predetermined angle (e.g., 45°).

Further, in the step of molding the fiber-reinforced resin sheets, as long as the protruding parts are able to engage with the fiber-reinforced resin sheets to be laminated therewith, their quantity, etc., is not limited in any particular way. However, more preferably, in the step of molding the fiber-reinforced resin sheet, the protruding part and the recessed part are molded in such a manner that the fiber-reinforced resin sheet becomes a corrugated sheet having a given cycle.

With this aspect, by having it be a corrugated sheet with a given cycle, positional misalignment and angle misalignment at the time of sheet lamination may be mitigated. As a result, a laminated state of the fiber-reinforced resin sheets may be maintained.

In addition, in the above-discussed process, at the time of lamination, the fiber-reinforced resin sheets are laminated in such a manner that the protruding parts and the recessed parts overlap with one another. However, in another preferred aspect: in the step of producing the fiber-reinforced resin sheet, a sheet of resin fibers comprising a thermoplastic resin is used as the thermoplastic resin sheet, and the fiber-reinforced resin sheet is produced in such a manner that the resin fibers are disposed by being drawn and aligned along the same direction as the fiber direction; in the step of molding the fiber-reinforced resin sheet, the fiber-reinforced resin sheet is molded by melting the thermoplastic resin of the resin fibers of only the protruding part and the recessed part in such a manner that the protruding part and the recessed part are formed along a direction that intersects with at least the fiber direction; and in the step the fiber-reinforced resin sheet, the fiber-reinforced resin sheet is laminated in such a manner that the protruding part of the fiber-reinforced resin sheet is inserted between the reinforcement fibers and the resin fibers of the fiber-reinforced resin sheet that is to be laminated therewith.

With this aspect, by inserting the protruding parts of the fiber-reinforced resin sheets between the reinforcement fibers and the resin fibers at the time of laminating the fiber-reinforced resin sheets, the fiber-reinforced resin sheets may be provisionally fastened while being positioned. Thus, no foreign material, such as stitching, a thermal adhesive, etc., becomes mixed in. In addition, a positioned state (laminated state) may be maintained without using a special device that utilizes ultrasonic waves, and so forth.

In addition, in a preferred aspect, in the step of producing the fiber-reinforced resin sheet, a reinforcement fiber sheet in which a reinforcement fiber bundle is spread is used as the reinforcement fibers. With this aspect, by using reinforcement fiber sheets with spread fibers, it becomes easier to impregnate the gaps among the reinforcement fibers with the thermoplastic resin. In addition, since the spread reinforcement fiber sheets are thinner than conventional sheets, it becomes easier to form the protruding parts and the recessed parts when molding the fiber-reinforced resin sheets.

Advantageous Effects of Invention

With the present invention, in laminating the fiber-reinforced resin sheets, damage to and defects in the reinforcement fibers may be mitigated, and they may be positioned and laminated with ease, while at the same time, upon molding, having the reinforcement fibers conform to the shape of the mold with ease.

DESCRIPTION OF EMBODIMENTS

Figure 1:
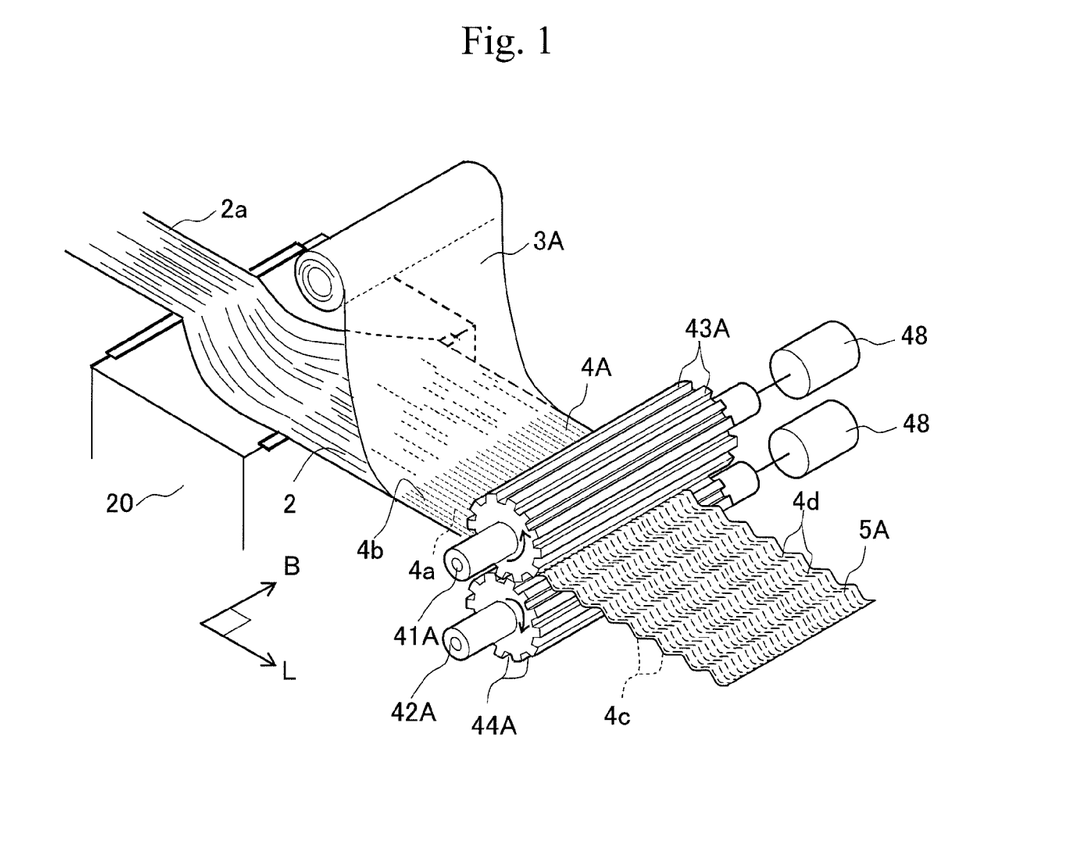
FIG. 1 is a schematic perspective view illustrating a step of producing a fiber-reinforced resin sheet and a step of molding the fiber-reinforced resin sheet according to the first embodiment of the present invention.
Figure 2:
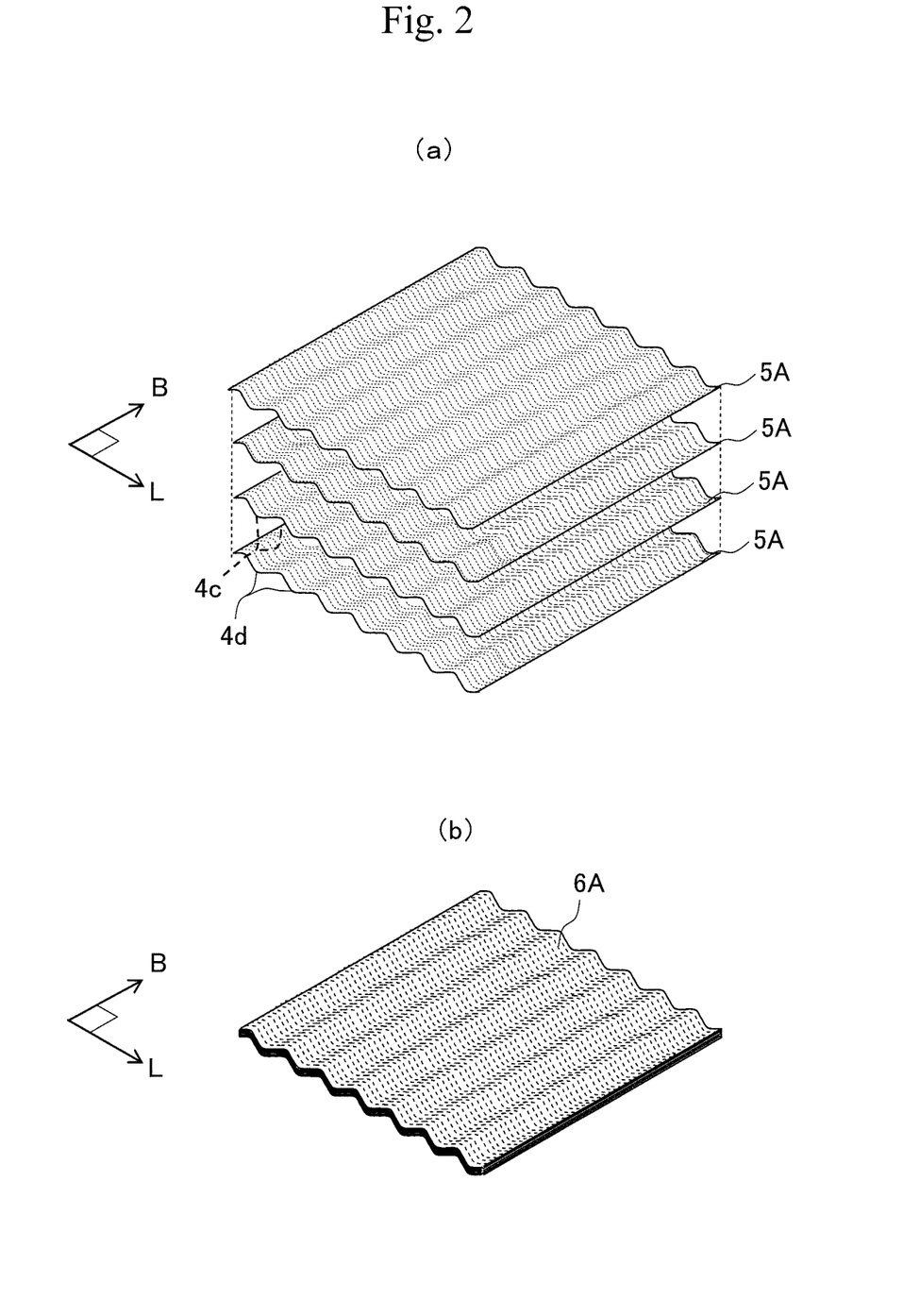
FIG. 2 shows schematic perspective views illustrating a step of laminating fiber-reinforced resin sheets according to the first embodiment of the present invention, where (a) is a view showing a state before four identical fiber-reinforced resin sheets are laminated, and (b) is a view showing a post-lamination state.

The present invention is described below with reference to the drawings based on several embodiments. FIG. 1 is a schematic perspective view illustrating a step of producing a fiber-reinforced resin sheet and a step of molding the fiber-reinforced resin sheet according to the first embodiment of the present invention. FIG. 2 shows schematic perspective views illustrating a step of laminating fiber-reinforced resin sheets according to the first embodiment of the present invention, where (a) is a view showing a state before four identical fiber-reinforced resin sheets are laminated, and (b) is a view showing a post-lamination state.

Figure 3:
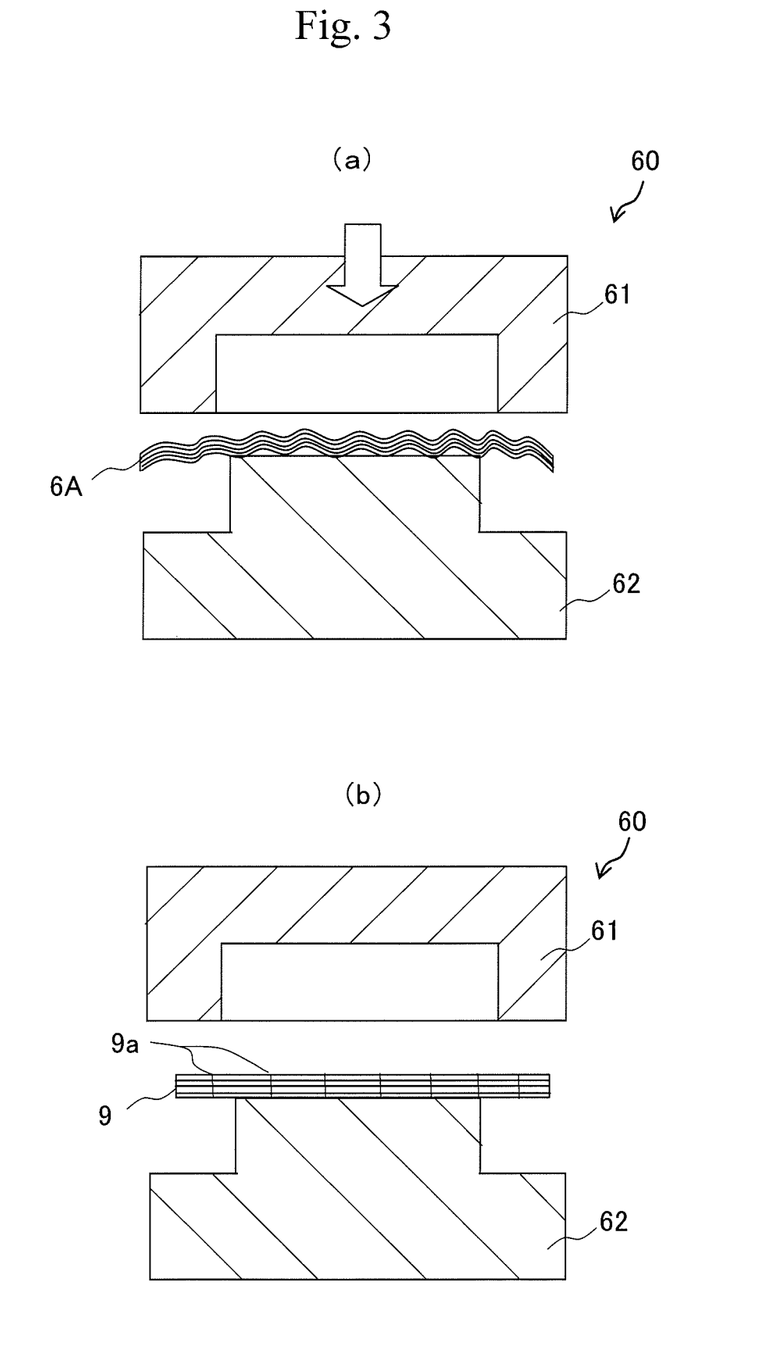
FIG. 3 shows schematic sectional views of molds to illustrate a step of molding a fiber-reinforced resin material according to the first embodiment of the present invention, where (a) is a view illustrating the molding of laminated fiber-reinforced resin sheets of the present embodiment, and (b) is a view illustrating the molding of conventional laminated fiber-reinforced resin sheets.

FIG. 3 shows schematic sectional views of molds to illustrate a step of molding a fiber-reinforced resin material according to the first embodiment of the present invention, where (a) is a view illustrating the molding of laminated fiber-reinforced resin sheets of the present embodiment, and (b) is a view illustrating the molding of conventional laminated fiber-reinforced resin sheets.

The present embodiment is a process for producing a fiber-reinforced resin material comprising reinforcement fibers and a thermoplastic resin. As shown in FIG. 1, a reinforcement fiber bundle (multifilament) 2a is prepared as reinforcement fibers. The reinforcement fiber bundle 2a is spread using a spreading device 20, thereby producing a reinforcement fiber sheet 2 in which the reinforcement fibers are drawn and aligned in the same direction. Here, as long as the reinforcement fiber bundle may be spread (loosened) in breadth direction B so as to be spread into a reinforcement fiber sheet 2 of a predetermined thickness, it may be spread by any process, e.g., spreading using air, spreading using ultrasonic waves, spreading using a bar or a roller, etc. The spreading device 20 is a commonly known spreading device capable of performing such processes. In addition, although the spreading device 20 is used in the present embodiment, a pre-spread reinforcement fiber sheet may also be used instead.

On the other hand, a film-shaped resin sheet 3A comprising a thermoplastic resin wound into a roll is supplied to the spread fiber reinforcement sheet 2 as a thermoplastic resin. Thus, a fiber-reinforced resin sheet 4A is produced from the reinforcement fiber sheet 2 and the resin sheet 3A.

It is noted that gaps among the reinforcement fibers of the reinforcement fiber sheet 2 may be impregnated with at least a portion of the thermoplastic resin of the resin sheet 3A by heating and pressurizing the reinforcement fiber sheet 2 and the resin sheet 3A in advance using heating rollers, etc. In addition, although a film-shaped resin sheet is used for the resin sheet 3A in the case above, it may also be resin fibers drawn and aligned in one direction, or molten resin extruded from an extruder.

Here, the reinforcement fibers forming the reinforcement fiber bundle 2a and the reinforcement fiber sheet 2 are resin reinforcement fibers for reinforcing the mechanical strength of a fiber-reinforced resin material. Examples of such reinforcement fibers may include such fibers as glass fiber, carbon fiber, aramid fiber, alumina fiber, boron fiber, steel fiber, PBO fiber, natural fiber, high-strength polyethylene fiber, etc.

In addition, for the thermoplastic resin forming the resin sheet 3A, examples may include such resins as polypropylene-based resin, nylon-based resin, epoxy-based resin, phenol-based resin, melamine-based resin, urea-based resin, silicone-based resin, maleimide-based resin, vinylester-based resin, unsaturated polyester-based resin, cyanate-based resin, polyimide-based resin, etc. As long as it is able to maintain a predetermined strength together with the reinforcement fibers, its type is not limited in any particular way.

Next, the produced fiber-reinforced resin sheet 4A is molded using a pair of heating rollers 41A and 42A. The heating rollers 41A and 42A are respectively connected to motors 48 and 48. Both of the heating rollers 41A and 42A are rollers for molding the fiber-reinforced resin sheet 4A and imparting recessed and protruding shapes thereto.

With respect to both of the heating rollers 41A and 42A, protruding ridge parts 43A and recessed groove parts 44A corresponding to the shape of the protruding ridge parts 43A are formed on/in the roller circumferential surface along the axial direction at regular intervals in the circumferential direction. In addition, heaters (not shown) are provided inside the heating rollers 41A and 42A. The circumferential surfaces of the heating rollers 41A and 42A are heated to a temperature equal to or greater than the melting point of the thermoplastic resin by these heaters.

In order to form protruding parts 4c on one face 4a of the fiber-reinforced resin sheet 4A along breadth direction B and to form, along breadth direction (a direction orthogonal to fiber direction L) B, recessed parts 4d in the other face 4b located on the opposite side to the protruding parts 4c, at least parts of the fiber-reinforced resin sheet 4A corresponding to the protruding parts 4c and the recessed parts 4d are heated and pressurized.

Specifically, by heating and pressurizing the fiber-reinforced resin sheet 4A while sandwiching the fiber-reinforced resin sheet 4A between the protruding ridge parts 43A and the recessed groove parts 44A between the heating rollers, the protruding parts 4c and the recessed parts 4d are molded along breadth direction B.

In addition, because the heating rollers 41A and 42A are rotated while the fiber-reinforced resin sheet 4A is sandwiched by the heating rollers 41A and 42A, the protruding parts 4c and the recessed parts 4d are molded on/in both faces 4a and 4b of the fiber-reinforced resin sheet 4A in such a manner that the fiber-reinforced resin sheet 4A becomes a corrugated sheet 5A having a given cycle.

In this case, the shape of the corrugated sheet 5A (the molded fiber-reinforced resin sheet 4A) is preferably such that its cross-section along fiber direction L shown in FIG. 1 is of a waveform shape such as a sine wave, and its wavelength is equal to or less than twice, or more preferably equal to or less than one times, the sheet breadth. In addition, the amplitude, which is the height of the waveform, is preferably 5 mm or less.

Here, what is important is that the protruding parts 4c and the recessed parts 4d are formed by the protruding ridge parts 43A and the recessed groove parts 44A. The heaters may heat the protruding ridge parts 43A and the recessed groove parts 44A locally. If impregnation with the thermoplastic resin is to be performed, the heaters may be so provided as to heat the heating rollers as a whole.

Next, as shown in FIGS. 2(a) and (b), a plurality (four in the drawings) of the corrugated sheets 5A (the molded fiber-reinforced resin sheets 4A) are prepared. The corrugated sheets 5A are laminated while having at least the protruding parts of the corrugated sheets 5A engage with the corrugated sheets 5A to be laminated therewith. Specifically, the corrugated sheets 5A are laminated in such a manner that the protruding parts 4c and recessed parts 4d of opposing faces of the corrugated sheets 5A and 5A to be laminated overlap with one another. Thus, the laminate 6A shown in FIG. 2(b) may be obtained.

At the time of lamination, the corrugated sheets 5A and 5A may be provisionally fastened with one another while aligning the positions and angles (a uniaxial reinforcement fiber orientation where the fiber direction is 0°) of the corrugated sheets 5A and 5A relative to one another with ease. In addition, a laminated state of the corrugated sheets 5A (the molded fiber-reinforced resin sheets 4A) may be maintained by virtue of the shape of the corrugated sheets 5A without using stitching, an adhesive, etc. Thus, no damage to or defects in the reinforcement fibers is/are caused, and a resin of a different type is never mixed in.

Further, as shown in FIG. 3(a), using a mold 60 comprising a heated upper mold 61 and lower mold 62, the laminated corrugated sheets 5A (the laminate 6A) are molded into a fiber-reinforced resin material while being pressurized and heated in such a manner as to impregnate the reinforcement fibers with the thermoplastic resin. Thus, a fiber-reinforced resin material that is reinforced in one direction (that has the reinforcement fibers oriented in one direction) may be obtained.

Conventionally, as shown in FIG. 3(b), the fiber distance varies between the recessed part of the upper mold 61 and the protruding part of the lower mold 62, and a laminate 9 of fiber-reinforced resin sheets has the layers fixed to one another with stitching 9a or an adhesive. Thus, when one tries to impart a three-dimensional shape to the laminate 9, the movement of the reinforcement fibers is restricted, and it was difficult to mold the laminate 9 to cause it to conform to the mold shape.

However, in the case of the present embodiment, in molding the laminated corrugated sheets 5A (the laminate 6A) by pressurizing and heating them, since the corrugated sheets 5A and 5A are in a provisionally fastened state with one another as discussed above, they may be molded into a fiber-reinforced resin material by causing the reinforcement fibers to conform to the shape of the mold with ease while causing almost no positional or angle misalignment among the corrugated sheets 5A and 5A at the time of pressing.

Figure 4:
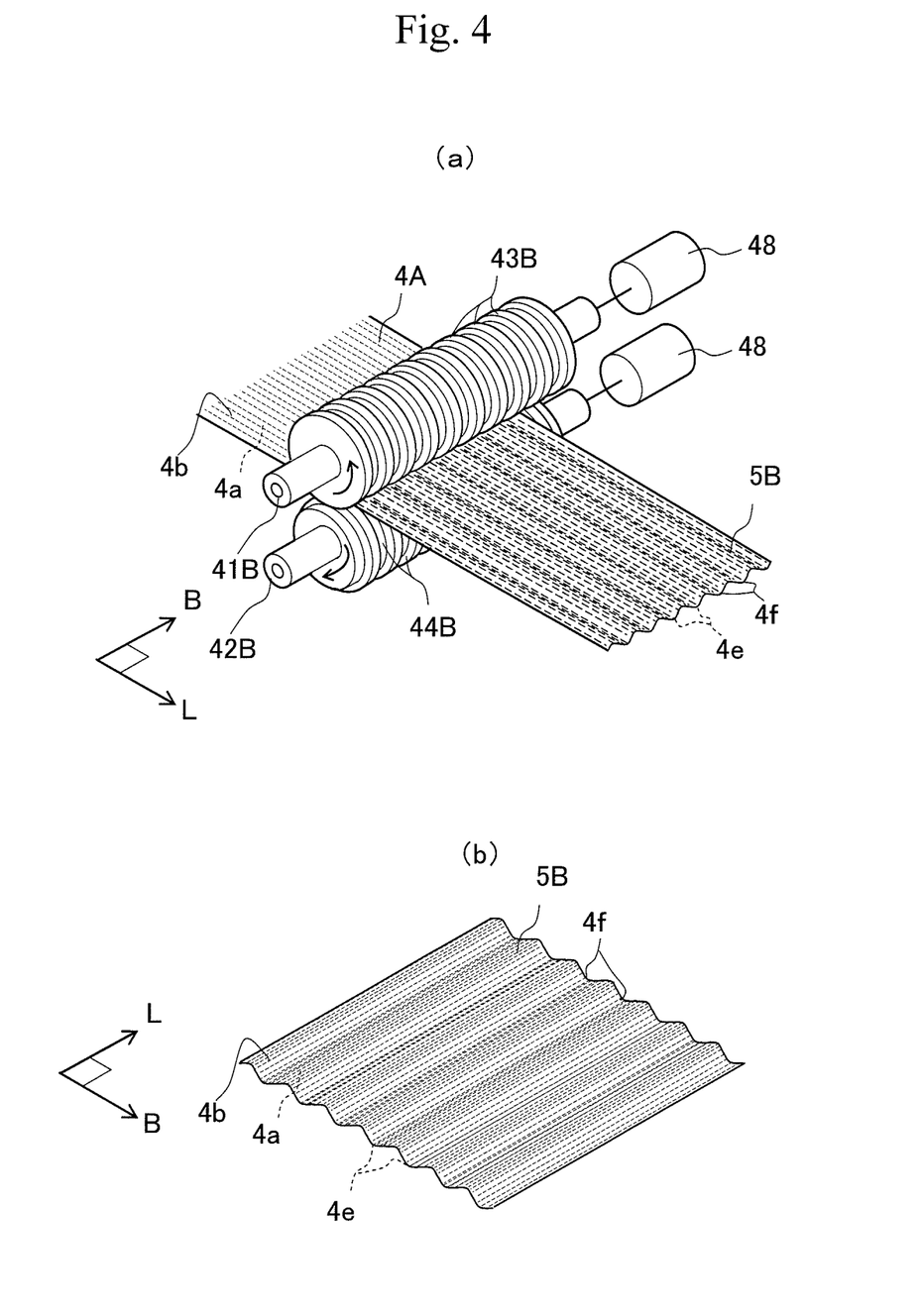
FIG. 4 shows views illustrating a fiber-reinforced resin material production process according to the second embodiment of the present invention, where (a) is a schematic perspective view illustrating a step of molding a fiber-reinforced resin sheet, and (b) is a schematic perspective view of a molded fiber-reinforced resin sheet.

FIG. 4 shows views illustrating a fiber-reinforced resin material production process according to the second embodiment of the present invention, where (a) is a schematic perspective view illustrating a step of molding a fiber-reinforced resin sheet, and (b) is a schematic perspective view of a molded fiber-reinforced resin sheet.

Figure 5:
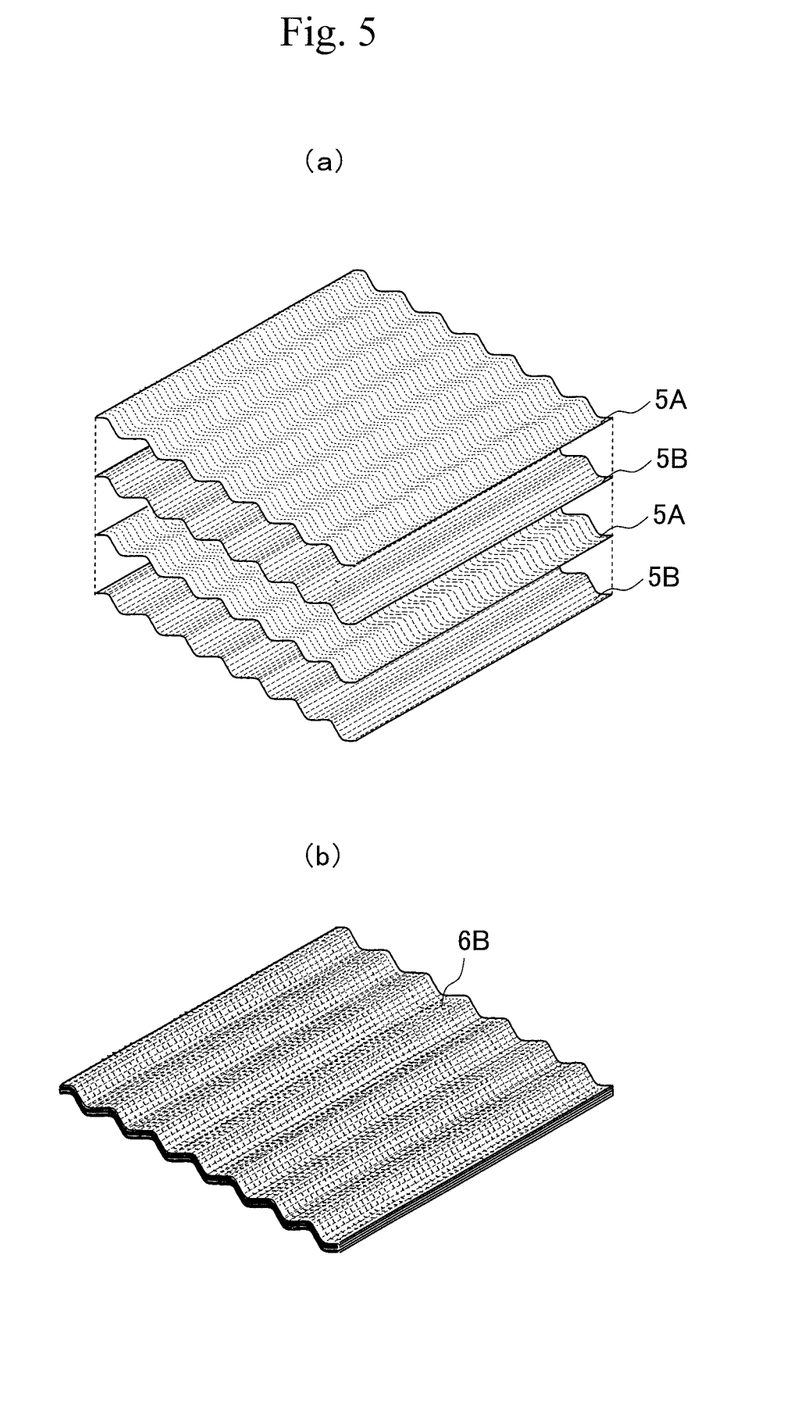
FIG. 5 shows schematic perspective views illustrating a step of laminating fiber-reinforced resin sheets according to the second embodiment of the present invention, where (a) is a view showing a state before four fiber-reinforced resin sheets are laminated, and (b) is a view showing a post-lamination state.

FIG. 5 shows schematic perspective views illustrating a step of laminating fiber-reinforced resin sheets according to the second embodiment of the present invention, where (a) is a view showing a state before four fiber-reinforced resin sheets are laminated, and (b) is a view showing a post-lamination state.

The second embodiment differs from the first embodiment in the step of molding a fiber-reinforced resin sheet and in the step of laminating molded fiber-reinforced resin sheets (corrugated sheets). Accordingly, like elements found in the first embodiment are designated with like reference numerals while omitting their descriptions. Only those points that differ are described in detail below.

In the present embodiment, in the step of molding fiber-reinforced resin sheets, in order to form the protruding parts of the fiber-reinforced resin sheets to be laminated in a different direction with respect to the fiber direction, two types of fiber-reinforced resin sheets are molded in accordance with the protruding parts, and fiber-reinforced resin sheets with protruding parts formed in different directions are alternately laminated with one another.

Specifically, as shown in FIGS. 4(a) and (b), the fiber-reinforced resin sheet 4A is molded using a pair of heating rollers 41B and 42B. With respect to both of the heating rollers 41B and 42B, protruding ridge parts 43B and recessed groove parts 44B corresponding to the shape of the protruding ridge parts 43B are formed on/in the roller circumferential surface along the circumferential direction at regular intervals. In addition, heaters (not shown) are provided inside the heating rollers 41B and 42B. The circumferential surfaces of the heating rollers 41B and 42B are heated to a temperature equal to or greater than the melting point of the thermoplastic resin by these heaters.

Thus, in order to form protruding parts 4e on one face 4a of the fiber-reinforced resin sheet 4A in longitudinal direction (fiber direction) L and to form recessed parts 4f in the other face 4b located on the opposite side to the protruding parts 4e in longitudinal direction L, at least parts of the fiber-reinforced resin sheet 4A corresponding to the protruding parts 4e and the recessed parts 4f are heated and pressurized.

Specifically, by heating and pressurizing the fiber-reinforced resin sheet 4A while sandwiching the fiber-reinforced resin sheet 4A between the protruding ridge parts 43B and the recessed groove parts 44B between the heating rollers 41B and 42B, the protruding parts 4e and the recessed parts 4f are molded in fiber direction (longitudinal direction) L.

Since the protruding ridge parts 43B and the recessed groove parts 44B corresponding to the shape of the protruding ridge parts 43B are formed in the circumferential direction at regular intervals, the protruding parts 4e and the recessed parts 4f are molded on/in both faces 4a and 4b of the fiber-reinforced resin sheet 4A in such a manner that the fiber-reinforced resin sheet 4A becomes a corrugated sheet 5B whose cross-section along breadth direction B has a given cycle.

Next, as shown in FIGS. 5(a) and (b), a plurality (four in the drawing) of the corrugated sheets 5A molded in the first embodiment and of the corrugated sheets 5B molded in the present embodiment (two of each in the drawings) are prepared. Specifically, the corrugated sheets 5A and 5B are alternately laminated in such a manner that the protruding parts and the recessed parts of the corrugated sheets 5A and 5B to be laminated with one another overlap with one another.

In the present embodiment, a fiber-reinforced resin sheet (a first fiber-reinforced resin sheet) is molded with respect to the first embodiment in such a manner as to form the protruding parts and the recessed parts along breadth direction B (first direction), which is orthogonal to the fiber direction in which the reinforcement fibers are drawn and aligned, thereby producing the corrugated sheet 5A. On the other hand, a second fiber-reinforced resin sheet is molded in such a manner as to form the protruding parts and the recessed parts along fiber direction L (a second direction that differs from the first direction), thereby producing the corrugated sheet 5B.

By then alternately laminating the corrugated sheets 5A and 5B so that the molded protruding parts and recessed parts overlap with one another, a laminate 6B in which the reinforcement fibers intersect at 90° may be obtained with ease and accurately without any angle alignment at the time of lamination. Thus, a fiber-reinforced resin material comprising reinforcement fibers oriented along two axes may be produced. Further, the produced fiber-reinforced resin material will have mechanical pseudo-isotropy.

Figure 6:
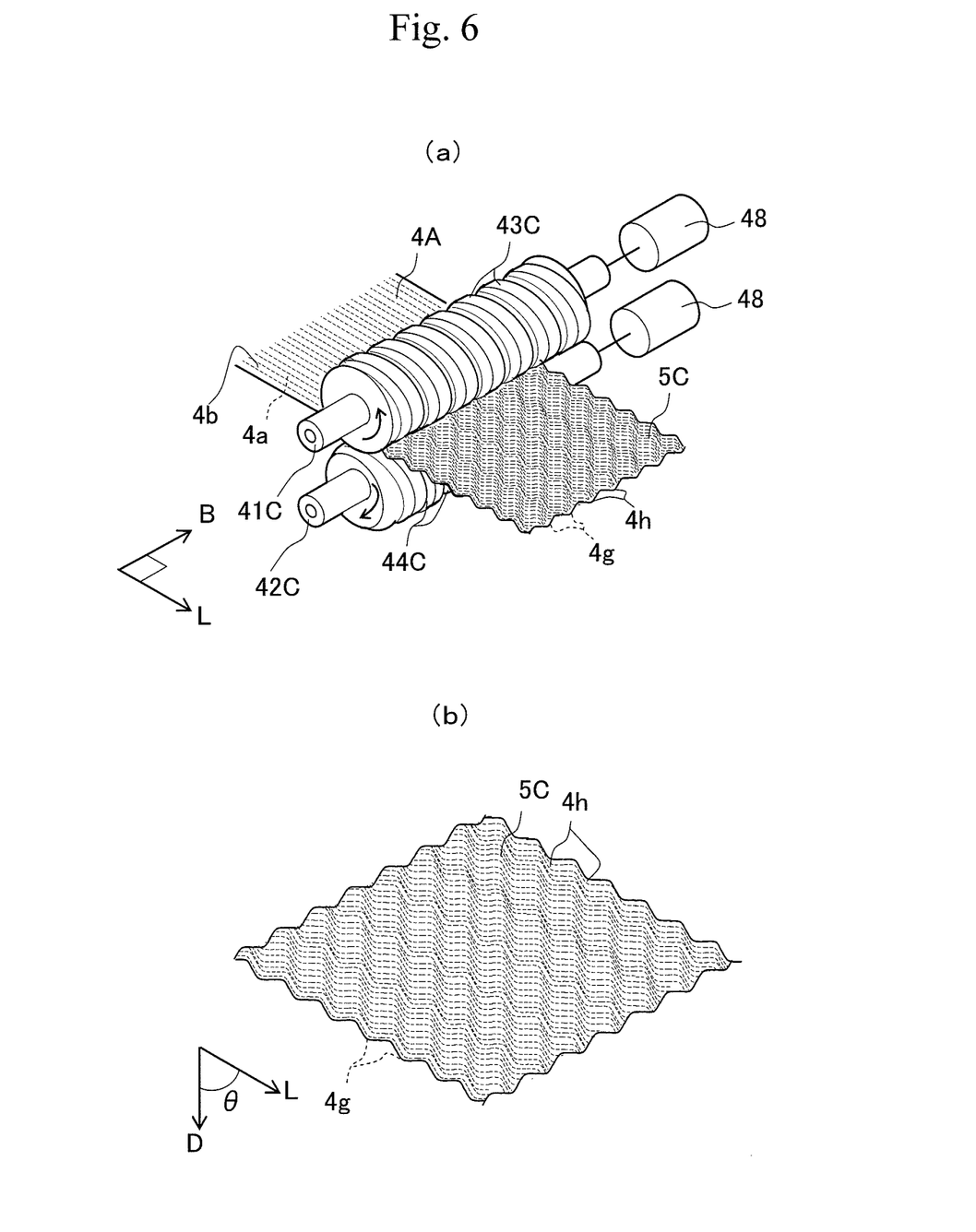
FIG. 6 shows views illustrating a fiber-reinforced resin material production process according to another aspect of the second embodiment of the present invention, where (a) is a schematic perspective view illustrating a step of molding a fiber-reinforced resin sheet, and (b) is a schematic perspective view of a molded fiber-reinforced resin sheet.

FIG. 6 shows views illustrating a fiber-reinforced resin material production process according to another aspect of the second embodiment of the present invention, where (a) is a schematic perspective view illustrating a step of molding a fiber-reinforced resin sheet, and (b) is a schematic perspective view of a molded fiber-reinforced resin sheet.

Specifically, as shown in FIGS. 6(a) and (b), the fiber-reinforced resin sheet 4A is molded using a pair of heating rollers 41C and 42C. With respect to both of the heating rollers 41C and 42C, protruding ridge parts 43C and recessed groove parts 44C are formed helically on/in the roller circumferential surfaces along the circumferential direction at a regular pitch.

In order to form protruding parts 4g on one face 4a of the fiber-reinforced resin sheet 4A along direction D, which intersects at predetermined angle θ (45° in the drawing), and to form recessed parts 4h along direction D in the other face 4b located on the opposite side to the protruding parts 4g, at least parts of the fiber-reinforced resin sheet 4A corresponding to the protruding parts 4g and the recessed parts 4h are heated and pressurized while sandwiching the fiber-reinforced resin sheet 4A between the protruding ridge parts 43C and the recessed groove parts 44C between the heating rollers 41C and 42C. Thus, the protruding parts 4g and the recessed parts 4h are molded along direction D, which intersects with fiber direction L at predetermined angle θ (45° in the drawings).

Because the protruding ridge parts 43C and the recessed groove parts 44C corresponding to the shape of the protruding ridge parts 43C are thus formed helically along the circumferential direction at a regular pitch, the protruding parts 4g and the recessed parts 4h are molded on/in both faces 4a and 4b of the fiber-reinforced resin sheet 4A in such a manner that the fiber-reinforced resin sheet 4A becomes a corrugated sheet 5C having a given cycle.

By laminating such a corrugated sheet 5C with the above-discussed corrugated sheet 5A and/or corrugated sheet 5B, it is possible to obtain a fiber-reinforced resin material comprising multi-axial reinforcement fibers where the reinforcement fibers intersect at predetermined angle θ (e.g., 45°).

Figure 7:
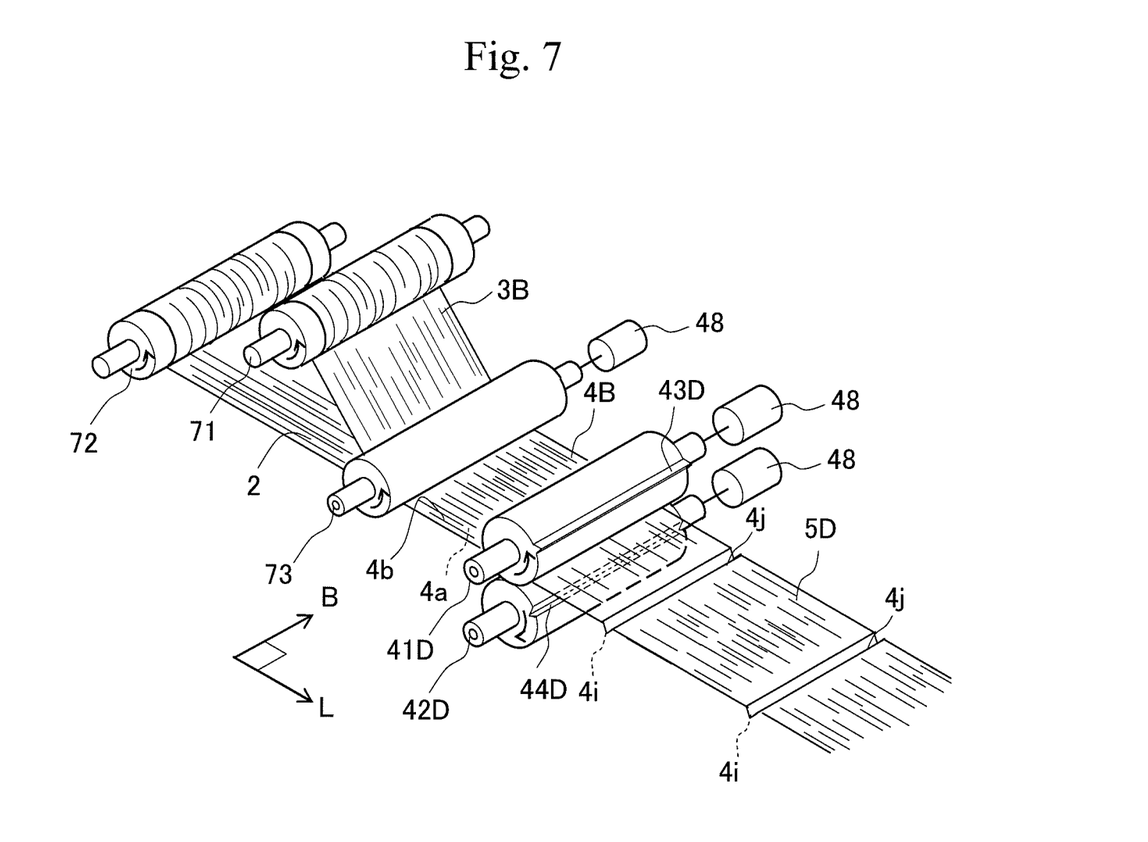
FIG. 7 is a schematic perspective view illustrating a step of producing a fiber-reinforced resin sheet and a step of molding the fiber-reinforced resin sheet according to the third embodiment of the present invention.
Figure 8:
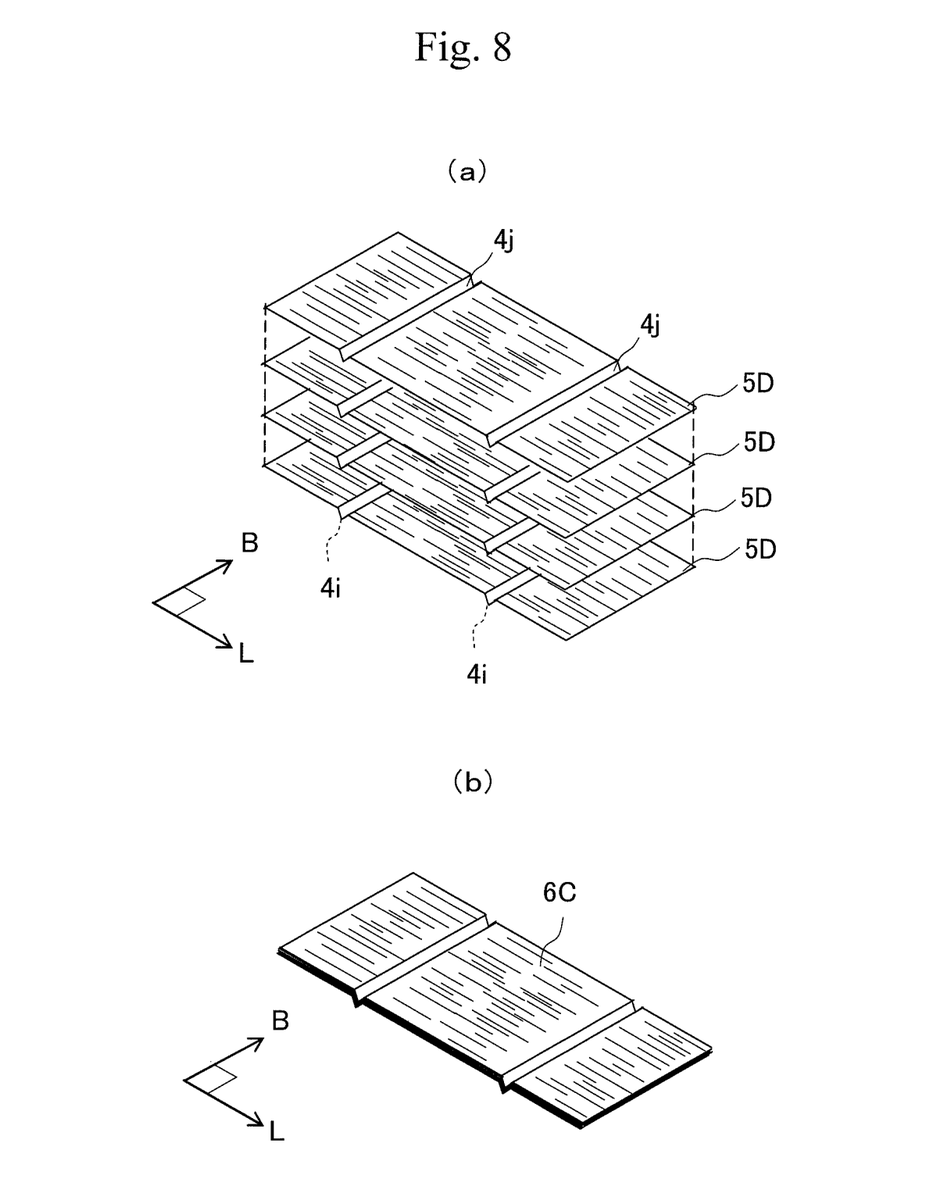
FIG. 8 shows schematic perspective views illustrating a step of laminating fiber-reinforced resin sheets according to the third embodiment of the present invention, where (a) is a view showing a state before four fiber-reinforced resin sheets are laminated, and (b) is a view showing a post-lamination state.

FIG. 7 is a schematic perspective view illustrating a step of producing a fiber-reinforced resin sheet and a step of molding the fiber-reinforced resin sheet according to the third embodiment of the present invention. FIG. 8 shows schematic perspective views illustrating a step of laminating fiber-reinforced resin sheets according to the third embodiment of the present invention, where (a) is a view showing a state before four fiber-reinforced resin sheets are laminated, and (b) is a view showing a post-lamination state.

Figure 9:
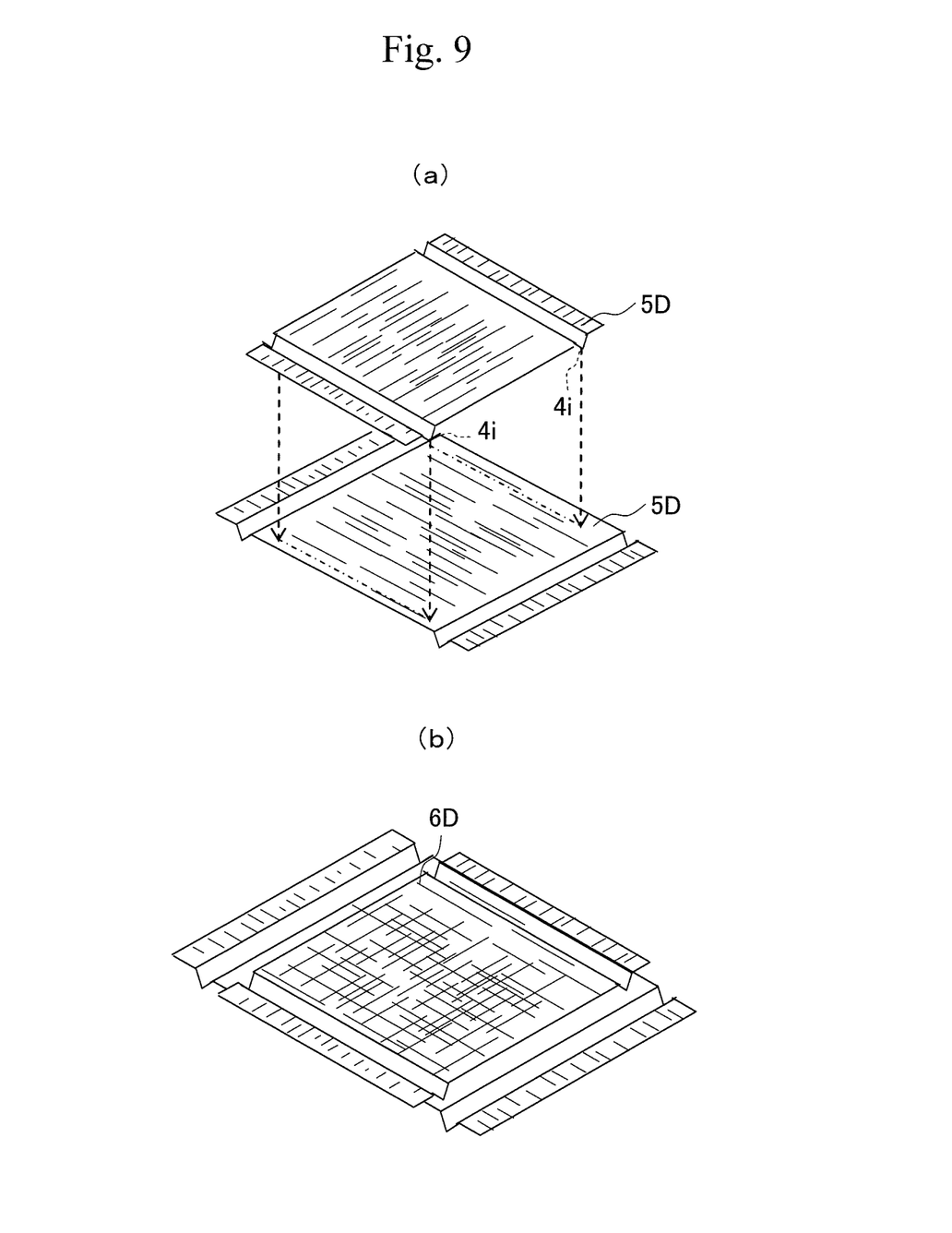
FIG. 9 shows schematic perspective views illustrating a step of laminating fiber-reinforced resin sheets according to another aspect of the third embodiment of the present invention, where (a) is a view showing a state before two fiber-reinforced resin sheets are laminated, and (b) is a view showing a post-lamination state.

In addition, FIG. 9 shows schematic perspective views illustrating a step of laminating fiber-reinforced resin sheets according to another aspect of the third embodiment of the present invention, where (a) is a view showing a state before two fiber-reinforced resin sheets are laminated, and (b) is a view showing a post-lamination state.

The third embodiment differs from the first embodiment in the step of producing a fiber-reinforced resin sheet, the step of molding a fiber-reinforced resin sheet, and the step of laminating molded fiber-reinforced resin sheets. Accordingly, like elements found in the first embodiment are designated with like reference numerals while omitting their descriptions. Only those points that differ are described in detail below.

In the present embodiment, as shown in FIG. 7, in the step of producing a fiber-reinforced resin sheet, a sheet comprising resin fibers comprising a thermoplastic resin and that are wound around a roll 71 is used as a resin sheet 3B. In other words, resin fibers are drawn and aligned in one direction and are in the form of a sheet.

The spread reinforcement fiber sheet 2 wound around a roll 72 is used for the reinforcement fiber sheet. Then, using a pressing roll 73, a fiber-reinforced resin sheet 4B is produced in such a manner that the resin fibers are so disposed as to be drawn and aligned along the same direction as fiber direction L of the reinforcement fibers.

Next, in the step of molding the fiber-reinforced resin sheet, the fiber-reinforced resin sheet is molded using heating rollers 41D and 42D. A pair comprising a V-shaped protruding ridge part 43D and a V-shaped recessed groove part 44D corresponding to the shape of the protruding ridge part 43D is formed on/in the heating rollers 41D and 42D. Heaters (not shown) that locally heat the protruding ridge part 43D and the recessed groove part 44D are disposed inside the heating rollers 41D and 42D.

Then, using the heating rollers 41D and 42D, the fiber-reinforced resin sheet 5D is molded by melting the thermoplastic resin of the resin fibers of only the parts corresponding to V-shaped protruding parts 4i and recessed parts 4j along a direction where the protruding parts 4i and the recessed parts 4j intersect at least with fiber direction L (along breadth direction B that is orthogonal to the fiber direction), while sandwiching the fiber-reinforced resin sheet 4B between the protruding ling part 43D and the recessed groove part 44D between the heating rollers 41D and 42D.

As shown in FIGS. 8(a) and (b), in the step of laminating the fiber-reinforced resin sheets 5D, by laminating the fiber-reinforced resin sheets 5D in such a manner that the protruding parts 4i and the recessed parts 4j of the fiber-reinforced resin sheets 5D overlap with one another, it is possible to obtain a laminate 6C in which, as in the first embodiment, the reinforcement fibers are oriented in the same direction.

On the other hand, in another aspect, as shown in FIGS. 9(a) and (b), in the step of laminating the fiber-reinforced resin sheets 5D, the fiber-reinforced resin sheets are laminated in such a manner that the protruding parts 4i of the fiber-reinforced resin sheets are inserted between the reinforcement fibers and thermoplastic resin fibers of the fiber-reinforced resin sheets 5D to be laminated therewith.

By thus inserting the protruding parts 4i of the fiber-reinforced resin sheets 5D between the reinforcement fibers and the resin fibers at the time of laminating the fiber-reinforced resin sheets 5D, it is possible to provisionally fasten the fiber-reinforced resin sheets 5D while positioning them with respect to one another. Thus, sheets may be positioned with respect to one another without any foreign material, such as stitching, a thermal adhesive, etc., being mixed in. In addition, a positioned state (laminated state) may be maintained without using any special device that uses ultrasonic waves, etc. In addition, a laminate 6D in which the reinforcement fibers intersect at 90° may be obtained with ease and accurately without any angle alignment at the time of lamination, and a fiber-reinforced resin material comprising reinforcement fibers oriented along two axes may be produced.

It is noted that, although the protruding parts 4i and recessed parts 4j were molded to be V-shaped in this case, as long as the protruding parts of the fiber-reinforced resin sheets may be inserted between the reinforcement fibers and the thermoplastic resin fibers, the protruding parts and the recessed parts may also be molded to be U-shaped or rectangular. Further, it is preferable that their depths be comparable to or greater than the thickness of the fiber-reinforced resin sheet 4B.

Figure 10:
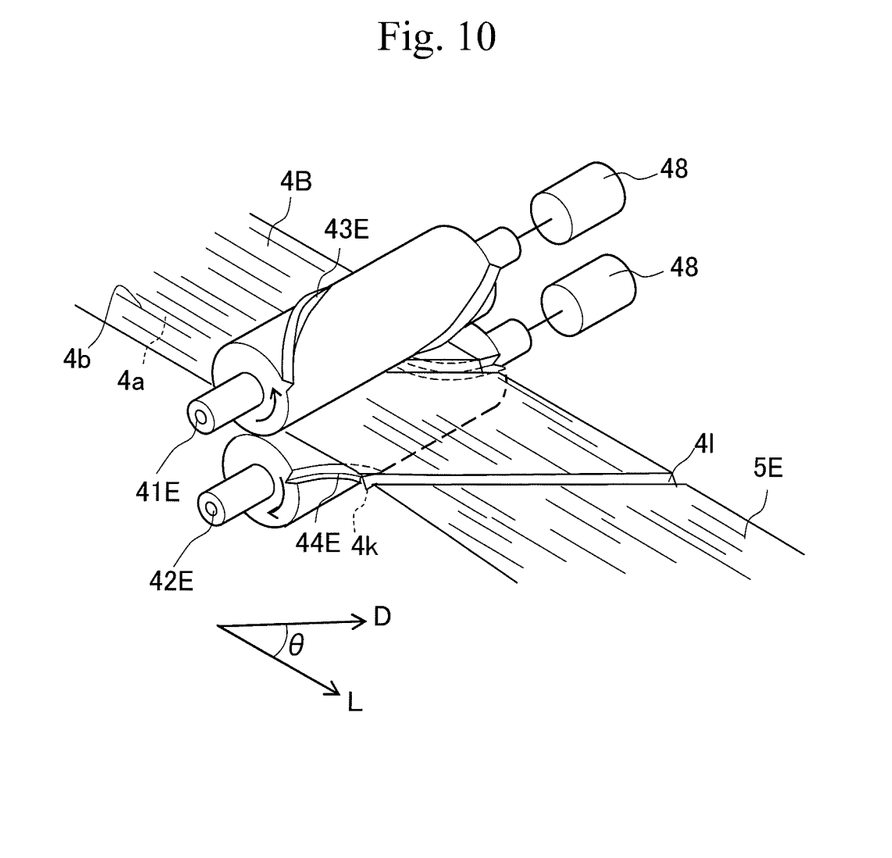
FIG. 10 is a schematic perspective view illustrating a step of producing a fiber-reinforced resin sheet according to another aspect of the third embodiment of the present invention.

FIG. 10 is a schematic perspective view illustrating a step of producing a fiber-reinforced resin sheet according to another aspect of the third embodiment of the present invention. Since, in this case, only the heating rollers and the fiber-reinforced resin sheet molded by these heating rollers differ, only those points are discussed below.

Specifically, as shown in FIG. 10, the fiber-reinforced resin sheet 4B is molded using a pair of heating rollers 41E and 42E. With respect to both of the heating rollers 41E and 42E, a protruding ridge part 43E and a recessed groove part 44E corresponding to the shape of the protruding ridge part 43E are formed helically on/in the roller circumferential surface along the circumferential direction.

Thus, in order to form protruding parts 4k on one face 4a of the fiber-reinforced resin sheet 4B in direction D that intersects with longitudinal direction (fiber direction) L at predetermined angle θ and to form recessed parts 4l along direction D in the other face 4b located on the opposite side to the protruding parts 4k, at least parts of the fiber reinforced resin sheet 4B corresponding to the protruding parts 4k and the recessed parts 4l are heated and pressurized using the pair of heating rollers 41E and 42E. A fiber-reinforced resin sheet 5E wherein the protruding parts 4k and the recessed parts 4l are molded along a direction that intersects with fiber direction L at predetermined angle θ (45° in the drawing) may thus be obtained.

Further, by laminating the above-discussed fiber-reinforced resin sheet 5D and fiber-reinforced resin sheet 5E as in FIGS. 9(a) and (b), it is possible to produce with ease and accurately a fiber-reinforced resin material comprising reinforcement fibers oriented along two axes in such a manner that the reinforcement fibers intersect at predetermined angle θ (e.g., 45°) without any angle alignment at the time of lamination.

Although embodiments of the present invention have been described in detail above, the present invention is by no means limited to the embodiments above, and various design modifications may be made within a scope that does not depart from the spirit of the present invention as defined by the claims.

In the first to third embodiments, fiber-reinforced resin sheets were molded in such a manner that protruding parts and recessed parts were formed by heating rollers. However, as long as protruding parts and recessed parts are formed, fiber-reinforced resin sheets may also be molded using, for example, a press device.

REFERENCE SIGNS LIST

2a: Reinforcement fiber bundle
2: Reinforcement fiber sheet
3A, 3B: Resin sheet
4A-4E: Fiber-reinforced resin sheet
4c, 4e, 4g, 4i, 4k: Protruding part
4d, 4f, 4h, 4j, 4l: Recessed part
5A-5C: Corrugated sheet
5D, 5E: Molded fiber-reinforced resin sheet
6A-6D: Laminate
41A-41E, 42A-42E: Heating roller
43A-43E: Protruding ridge part
44A-44E: Recessed groove part
48: Motor
60: Mold
61: Upper mold
62: Lower mold
B: Breadth direction
L: Fiber direction
73: Pressing roll

The invention claimed is:

1. A process for producing a fiber-reinforced resin material comprising reinforcement fibers and a thermoplastic resin, the process comprising at least:
    a step of producing fiber-reinforced resin sheets, each fiber-reinforced resin sheet produced from a reinforcement fiber sheet in which the reinforcement fibers are drawn and aligned in the same direction and a resin sheet comprising the thermoplastic resin;
    a step of molding each of the fiber-reinforced resin sheets by heating and pressurizing at least parts of the fiber-reinforced resin sheet corresponding to a protruding part and a recessed part so as to form the protruding part on one face of the fiber-reinforced resin sheet along one direction and to form the recessed part along the one direction in another face located on the opposite side to the protruding part;
    a step of laminating the fiber-reinforced resin sheets while causing at least the protruding part of one of the molded fiber-reinforced resin sheets to engage with a fiber-reinforced resin sheet that is to be laminated therewith; and
    a step of molding the laminated fiber-reinforced resin sheets into the fiber-reinforced resin material while pressurizing and heating them so as to impregnate the reinforcement fibers with the thermoplastic resin;
    wherein, in the step of laminating the fiber-reinforced resin sheets, the fiber-reinforced resin sheets are laminated in such a manner that the protruding parts of the respective fiber-reinforced resin sheets overlap with one another and the recessed parts of the respective fiber-reinforced resin sheets to be laminated with one another overlap with one another;
    wherein, in the step of molding the fiber-reinforced resin sheets, the protruding parts protrude in a direction that differs from a direction in which the reinforcement fibers are drawn and aligned;
    the step of molding the fiber-reinforced resin sheet comprises:
        a step of molding a first fiber-reinforced resin sheet in such a manner as to form the protruding part and the recessed part along a first direction that intersects with a fiber direction in which the reinforcement fibers are drawn and aligned; and
        a step of molding a second fiber-reinforced resin sheet in such a manner as to form the protruding part and the recessed part along a second direction that differs from the first direction, and
    in the step of laminating the fiber-reinforced resin sheet, the first and second fiberreinforced resin sheets are alternately laminated.

2. The process according to claim 1, wherein the first direction is a direction that is orthogonal to the fiber direction, and the second direction is a direction along the fiber direction.

3. The process according to claim 1, wherein the first direction is a direction that intersects with the fiber direction at a predetermined angle, and the second direction is a direction that is along the fiber direction or orthogonal to the fiber direction.

4. The process according to claim 1, wherein, in the step of molding the fiber-reinforced resin sheet, using a pair of heating rollers in which at least a protruding ridge part is formed on an outer roller circumferential surface of one of the heating rollers and a recessed groove part corresponding to the shape of the protruding ridge part is formed in an outer roller circumferential surface of the other heating roller, the protruding part and the recessed part are molded by performing pressurizing and heating while sandwiching the fiber-reinforced resin sheet between the protruding ridge part and the recessed groove part between the pair of heating rollers.

5. The process according to claim 1, wherein, in the step of molding the fiberreinforced resin sheets, the protruding part and the recessed part are molded in such a manner that the fiber-reinforced resin sheet becomes a corrugated sheet having a given cycle.

6. The process according to claim 1, wherein, in the step of producing the fiberreinforced resin sheets, a reinforcement fiber sheet in which a reinforcement fiber bundle is spread is used as the reinforcement fibers.

7. A process for producing a fiber-reinforced resin material comprising reinforcement fibers and a thermoplastic resin, the process comprising at least:
- a step of producing fiber-reinforced resin sheets, each fiber-reinforced resin sheet produced from a reinforcement fiber sheet in which the reinforcement fibers are drawn and aligned in the same direction and a resin sheet comprising the thermoplastic resin;
- a step of molding each of the fiber-reinforced resin sheets by heating and pressurizing at least parts of the fiber-reinforced resin sheet corresponding to a protruding part and a recessed part so as to form the protruding part on one face of the fiber-reinforced resin sheet along one direction and to form the recessed part along the one direction in another face located on the opposite side to the protruding part;
- a step of laminating the fiber-reinforced resin sheets while causing at least the protruding part of one of the molded fiber-reinforced resin sheets to engage with a fiber-reinforced resin sheet that is to be laminated therewith; and
- a step of molding the laminated fiber-reinforced resin sheets into the fiber-reinforced resin material while pressurizing and heating them so as to impregnate the reinforcement fibers with the thermoplastic resin;
- in the step of producing the fiber-reinforced resin sheet, a sheet of resin fibers comprising a thermoplastic resin is used as the thermoplastic resin sheet, and the fiber-reinforced resin sheet is produced in such a manner that the resin fibers are disposed by being drawn and aligned along the same direction as the fiber direction in which the reinforcement fibers are drawn and aligned,
- in the step of molding the fiber-reinforced resin sheet, the fiber-reinforced resin sheet is molded by melting the thermoplastic resin only of parts corresponding to the protruding part and the recessed part in such a manner that the protruding part and the recessed part intersect with at least the fiber direction, and
- in the step of laminating the fiber-reinforced resin sheet, the fiber-reinforced resin sheet is laminated in such a manner that the protruding part of the fiber-reinforced resin sheet is inserted between fibers including the reinforcement fibers and the resin fibers of the fiber-reinforced resin sheet that is to be laminated therewith.

8. The process according to claim 7, wherein, in the step of producing the fiber-reinforced resin sheets, a reinforcement fiber sheet in which a reinforcement fiber bundle is spread is used as the reinforcement fibers.

9. The process according to claim 7, wherein, in the step of molding the fiber-reinforced resin sheet, using a pair of heating rollers in which at least a protruding ridge part is formed on an outer roller circumferential surface of one of the heating rollers and a recessed groove part corresponding to the shape of the protruding ridge part is formed in an outer roller circumferential surface of the other heating roller, the protruding part and the recessed part are molded by performing pressurizing and heating while sandwiching the fiber-reinforced resin sheet between the protruding ridge part and the recessed groove part between the pair of heating rollers.

10. The process according to claim 7, wherein, in the step of laminating the fiber-reinforced resin sheets, the fiber-reinforced resin sheets are laminated in such a manner that the protruding parts of the respective fiber-reinforced resin sheets overlap with one another, and the recessed parts of the respective fiber-reinforced resin sheets to be laminated with one another overlap with one another.

11. The process according to claim 10, wherein, in the step of molding the fiber-reinforced resin sheets, the protruding parts protrude in a direction that differs from a direction in which the reinforcement fibers are drawn and aligned.

12. The process according to claim 7, wherein, in the step of molding the fiber-reinforced resin sheets, the protruding part and the recessed part are molded in such a manner that the fiber-reinforced resin sheet becomes a corrugated sheet having a given cycle.

* * * * *